(12) United States Patent
Meraz

(10) Patent No.: US 6,987,857 B1
(45) Date of Patent: Jan. 17, 2006

(54) FOCUS FADER WITH DUAL OPTOCOUPLERS

(75) Inventor: Rubin Meraz, Mesa, AZ (US)

(73) Assignee: Stanton Magnetics LLC, Boynton Beach, FL (US)

( * ) Notice: Subject to any disclaimer, the term of this patent is extended or adjusted under 35 U.S.C. 154(b) by 570 days.

(21) Appl. No.: 09/634,410

(22) Filed: Aug. 9, 2000

(51) Int. Cl.
 *H04B 1/00* (2006.01)

(52) U.S. Cl. .......................... 381/119; 369/4
(58) Field of Classification Search ............... 381/119, 381/104, 107, 109; 369/3, 4; 385/19, 140, 385/24

See application file for complete search history.

(56) References Cited

U.S. PATENT DOCUMENTS

| | | | | |
|---|---|---|---|---|
| 4,101,864 A | * | 7/1978 | Van Benthuysen | 338/183 |
| 4,172,248 A | * | 10/1979 | Okuya | 338/176 |
| 4,376,566 A | * | 3/1983 | Blackington | 385/19 |
| 4,426,634 A | * | 1/1984 | Okuya et al. | 338/161 |
| 4,429,219 A | * | 1/1984 | Yochum et al. | 250/229 |
| 4,947,440 A | * | 8/1990 | Bateman et al. | 381/107 |
| 5,177,801 A | * | 1/1993 | Shoda et al. | 381/119 |
| 5,825,279 A | * | 10/1998 | Yagi | 338/176 |
| 5,986,584 A | * | 11/1999 | Breitbarth | 341/13 |
| 6,173,105 B1 | * | 1/2001 | Aksyuk et al. | 385/140 |

FOREIGN PATENT DOCUMENTS

| | | |
|---|---|---|
| DE | 30 20 197 A1 | 12/1981 |
| WO | 99/63601 | 12/1999 |
| WO | 00/02330 | 1/2000 |

* cited by examiner

*Primary Examiner*—Vivian Chin
*Assistant Examiner*—Justin Michalski
(74) *Attorney, Agent, or Firm*—Pitney Hardin LLP

(57) ABSTRACT

The apparatus is a cross fader with dual optocouplers which communicate first and second audio signals. A manually controlled blade shutter travels along a linear path wherein at a first end of the path, a first edge of the blade shutter is inserted into the first optocoupler thereby attenuating or cutting the first audio signal. Likewise, at a second end of the path, a second edge of the blade shutter is inserted into the second optocoupler thereby attenuating or cutting the second audio signal.

9 Claims, 1 Drawing Sheet

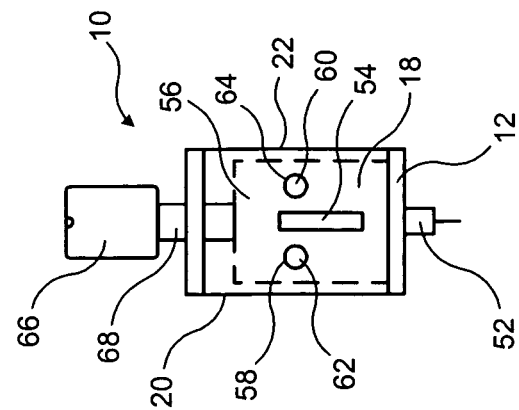
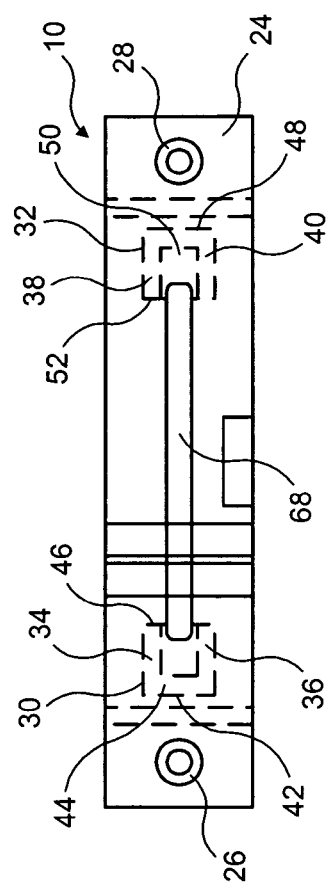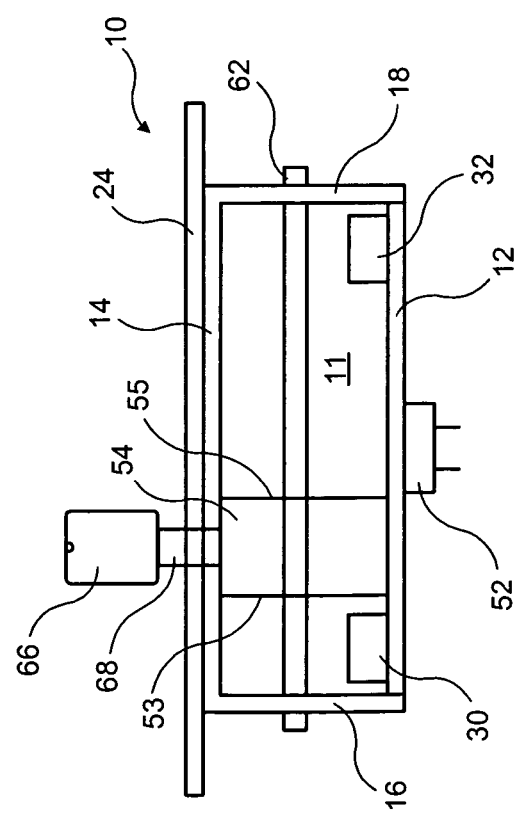

FOCUS FADER WITH DUAL OPTOCOUPLERS

BACKGROUND OF THE INVENTION

1. Field of the Invention

This invention pertains to a cross fader with dual optocouplers, which can be used in a DJ (disk jockey) mixer or as a replacement cross fader for a DJ mixer.

2. Description of the Prior Art

In the prior art, cross faders have used resistive components to allow a user, such as a disk jockey, to cut or short out a first signal from a respective channel of audio signal, while allowing the opposite channel of signal to pass. However, such resistive cross faders have been deficient with respect to noise, wear characteristics and lack of complete cutting of the respective signal.

OBJECTS AND SUMMARY OF INVENTION

It is therefore an object of the present invention to provide a cross fader which has improved characteristics with respect to noise.

It is therefore a still further object of the present invention to provide a cross fader which has improved characteristics with respect to wear.

It is therefore a still further object of the present invention to provide a cross fader which has improved characteristics with respect to the degree to which the signal is cut.

It is therefore a final object of the present invention to provide a cross fader which is mechanically and electronically compatible with existing equipment.

These and other objects are attained by providing a cross fader which uses dual optocouplers—one for each respective channel of the audio signal and located at each end of the fader travel. A blade shutter is positioned by guide rods so that it passes between the operational slots of the optocouplers. The blade shutter is mechanically coupled to a knob on the outside of the cross fader so that the operator can move the blade shutter into the operational slot of an optocoupler, thereby cutting the channel of the audio signal from that optocoupler while allowing the other channel of the audio signal from the other optocoupler to pass unimpeded.

The optocouplers are mounted on a p.c. board for ease of assembly. Likewise, the entire mechanism is mounted to a mounting plate for ease in replacement and securing to the frame of the disk jockey mixer.

DESCRIPTION OF THE DRAWINGS

Further objects and advantages of the invention will become apparent from the following description and claims, and from the accompanying drawings, wherein:

FIG. 1 is a side view, partially in phantom, of the cross fader of the present invention.

FIG. 2 is a top view, partially in phantom, of the cross fader of the present invention.

FIG. 3 is an end view, partially in phantom, of the cross fader of the present invention.

DETAILED DESCRIPTION OF THE PREFERRED EMBODIMENT

Referring now to the drawings in detail wherein like numerals refer to like elements throughout the several views, one sees that FIG. 1 is a side view of cross fader 10 of the present invention. Cross fader 10 includes hollow casing 11 formed from bottom plate 12 (which is typically formed from a P.C. board), top plate 14, end plates 16 and 18, and side plates 20 and 22 (see FIG. 3). Moreover, face plate 24 is affixed to top plate 14 and extends past end plates 16 and 18. As shown in FIG. 2, face plate 24 includes mounting apertures 26, 28 formed inwardly adjacent from the ends of mounting plate 24 and outwardly from end plates 16, 18, respectively. Mounting apertures 26, 28 are sized and spaced to allow cross fader to be mounted on conventional mixer panels as used by disk jockeys.

The interior of bottom plate 12 includes optocouplers 30, 32 at opposite ends thereof. As can be seen from FIG. 3, optocouplers 30, 32 are C-shaped with parallel side faces 34, 36 and 38, 40, respectively. Side faces 34, 36 of optocoupler 30 are joined by end face 42, thereby forming space 44 with mouth 46. Likewise, side faces 38, 40 of optocoupler 32 are joined by end face 48, thereby forming space 50 with mouth 52. Optocouplers 30, 32 receive first and second channels of an audio signal, respectively. The first channel is converted to an optical signal and transmitted from side face 34 through space 44 to side face 36. Likewise, the second channel is converted to an optical signal and transmitted from side face 36 through space 50 to side face 38. These optical signals can be attenuated or completely eliminated by the positioning of opaque material within spaces 44, 50. The input and output of the first and second channels, along with the power requirements, are provided through jack 52 which is on the exterior of bottom plate 12 (which, again, is preferably formed as a P.C. board).

Blade shutter 54, as shown in FIGS. 1 and 3, is mounted to support structure 56. Support structure 56 includes apertures 58, 60 through which parallel guide rods 62, 64 pass. Parallel guide rods 62, 64 are supported by end plates 16, 18. If the blade shutter 54 is pushed to a first extreme of the path of blade shutter 54, first edge 53 of blade shutter 54 is inserted through mouth 46 into space 44 thereby cutting or at least attenuating the optical signal communicated through optocoupler 30, while being free of contact or interference with optocoupler 32 thereby allowing the optical signal to pass without attenuation through optocoupler 32. Likewise, if blade shutter 54 is pushed to a second extreme of the path of blade shutter 54, second edge 55 of blade shutter 54 is inserted through mouth 52 into space 50 thereby cutting or at least attenuating the optical signal communicated through optocoupler 32, while being free of contact or interference with optocoupler 30 thereby allowing the optical signal to pass without attenuation through optocoupler 30. Furthermore, as shown in FIG. 1, as the length of blade shutter 54 (measured horizontally from the perspective of FIG. 1) is substantially less than the length of travel between spaces 44, 50, there is a range of positions of blade shutter 54 wherein blade shutter 54 is free from insertion into spaces 44, 50 and both optocouplers 30, 32 pass the respective signals without attenuation.

The position of blade shutter 54 is manually controlled by the user by the linear movement of knob 66. As shown in FIG. 2, slot 68 is formed through top plate 14 and face plate 24 allowing for stem 68 to provide direct mechanical communication between knob 66, support structure 56 and blade shutter 54 thereby allowing the user to move blade shutter 54 between the positions as described above to achieve the cross fading function.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A cross fader including:
   a first optocoupler for receiving and transmitting a first signal, said first optocoupler including a first space through which said first signal is optically communicated;
   a second optocoupler for receiving and transmitting a second signal, said second optocoupler including a second space through which said second signal is optically communicated; and
   a blade shutter with a range of travel, wherein at a first position in said range of travel, said blade shutter is inserted into said first space thereby at least attenuating said first signal, and wherein at a second position in said range of travel, said blade shutter is inserted into said second space thereby at least attenuating said second signal; and
   wherein an output signal is generated which is the sum of a first fraction of said first signal plus a second fraction of said second signal, wherein said first position is at a first end of said range of travel, wherein said second position is at a second end of said range of travel,
   wherein intermediate positions within said range of travel continuously vary attenuation of said first signal and said second signal, wherein movement of said blade shutter in a first direction increases said first fraction while decreasing said second fraction and wherein movement of said blade shutter in a second direction, opposite to said first direction, decreases said first fraction while increasing said second fraction.

2. The cross fader of claim 1 wherein said first and second optocouplers are C-shaped with a mouth through which said blade shutter enters said first and second spaces, respectively.

3. The cross fader of claim 2 wherein said blade shutter is mechanically responsive to a stem which passes through a slot in a surface of said cross fader to affix to a knob, wherein a user manipulates said knob to move said blade shutter within said range of travel.

4. The cross fader of claim 3 wherein guide rods define a direction of said range of travel.

5. The cross fader of claim 4 wherein said blade shutter is mounted on a support structure, said support structure including apertures through which said guide rods pass.

6. The cross fader of claim 5 wherein said knob is moved linearly along a path defined by said slot in order to move said blade shutter along said range of travel.

7. The cross fader of claim 6 wherein said range of travel includes a range of positions wherein said blade shutter is free from insertion into said first and second spaces.

8. The cross fader of claim 7 wherein said first and second optocouplers are mounted on a p.c. board, said p.c. board forming an interior surface of a chassis.

9. The cross fader of claim 8 wherein a face plate with mounting apertures is secured to said chassis.

* * * * *